(12) United States Patent
Purandare et al.

(10) Patent No.: US 10,482,480 B2
(45) Date of Patent: Nov. 19, 2019

(54) OCCUPANCY INTERACTION DETECTION

(71) Applicant: enLighted, Inc., Sunnyvale, CA (US)

(72) Inventors: Neeraj Purandare, Campbell, CA (US); Tanuj Mohan, Mountain View, CA (US); Bo E. Ericsson, Los Gatos, CA (US)

(73) Assignee: Enlighted, Inc., Sunnyvale, CA (US)

( * ) Notice: Subject to any disclaimer, the term of this patent is extended or adjusted under 35 U.S.C. 154(b) by 678 days.

(21) Appl. No.: 14/968,780

(22) Filed: Dec. 14, 2015

(65) Prior Publication Data
US 2016/0098024 A1 Apr. 7, 2016

Related U.S. Application Data

(63) Continuation-in-part of application No. 14/183,747, filed on Feb. 19, 2014, now Pat. No. 9,671,121.

(51) Int. Cl.
| | | |
|---|---|---|
| *G06F 3/01* | (2006.01) | |
| *G06Q 30/02* | (2012.01) | |
| *G01P 13/00* | (2006.01) | |
| *F24F 11/30* | (2018.01) | |
| *F24F 120/10* | (2018.01) | |
| *F24F 120/14* | (2018.01) | |

(52) U.S. Cl.
CPC .......... *G06Q 30/0201* (2013.01); *F24F 11/30* (2018.01); *G01P 13/00* (2013.01); *F24F 2120/10* (2018.01); *F24F 2120/14* (2018.01)

(58) Field of Classification Search
CPC .. G06Q 30/0201; F24F 11/30; F24F 2120/14; F24F 2120/10; G01P 13/00
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,437,596 B2 | 10/2008 | McFarland |

(Continued)

*Primary Examiner* — Cuong B Nguyen
*Assistant Examiner* — Samuel Park

(57) ABSTRACT

Apparatuses, methods, apparatuses and systems for occupancy interaction detection, are disclosed. One occupancy interaction detection system includes a plurality of sensors located within an area, the plurality of sensors operative to sense at least motion of a first occupant and a second occupant of the area, and communication links between each of the sensors and a controller. For an embodiment, the controller operative to receive sense data from the plurality of sensors, track locations of the first occupant of the area based on the sensed motion of the first occupant, track locations of the second occupant of the area based on the sensed motion of the second occupant, and identify an interaction between the first occupant and the second occupant, comprising detecting the first occupant to be within a threshold distance of the second occupant.

18 Claims, 13 Drawing Sheets

(56) References Cited

U.S. PATENT DOCUMENTS

| | | |
|---|---|---|
| 7,382,271 B2 | 12/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,792,956 B2 | 9/2010 | Choong et al. |
| 7,812,543 B2 | 10/2010 | Budike, Jr. |
| 7,925,384 B2 | 4/2011 | Huizenga et al. |
| 2004/0002792 A1 | 10/2004 | Hoffknecht |
| 2005/0169643 A1 | 8/2005 | Franklin et al. |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185597 A1 | 8/2008 | Veskovic et al. |
| 2008/0244104 A1 | 10/2008 | Clemente |
| 2008/0265796 A1 | 10/2008 | Null |
| 2009/0013052 A1* | 1/2009 | Robarts .............. G06F 17/30867 709/206 |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0280677 A1 | 11/2010 | Budike, Jr. |
| 2010/0295482 A1 | 11/2010 | Chemal et al. |
| 2010/0301777 A1 | 12/2010 | Chemal et al. |
| 2011/0031897 A1 | 2/2011 | Henig et al. |
| 2011/0199010 A1 | 8/2011 | Henig et al. |
| 2012/0031984 A1* | 2/2012 | Feldmeier ................ F24F 11/30 236/49.3 |
| 2013/0073093 A1* | 3/2013 | Songkakul ............ G05B 15/02 700/276 |
| 2013/0346017 A1* | 12/2013 | Stephens ................ G01B 21/16 702/150 |
| 2014/0012619 A1* | 1/2014 | Natarajan ............... H04L 51/32 705/7.19 |
| 2014/0035726 A1* | 2/2014 | Schoner ............ G06K 7/10366 340/8.1 |
| 2015/0005951 A1* | 1/2015 | Srinivasan ............ G05B 15/02 700/275 |
| 2016/0061469 A1* | 3/2016 | Albonesi ................... H02J 3/14 700/276 |

\* cited by examiner

OCCUPANCY INTERACTION DETECTION

RELATED APPLICATIONS

This patent application is a continuation-in-part (CIP) of U.S. patent application Ser. No. 14/183,747, filed Feb. 19, 2014, which is herein incorporated by reference.

FIELD OF THE EMBODIMENTS

The described embodiments relate generally to environmental control systems. More particularly, the described embodiments relate to methods, apparatuses and systems for tracking motion which can be used for occupancy interaction detection.

BACKGROUND

Building control systems exist for monitoring occupancy and energy usage. The building control systems may provide energy management and control based on sensed occupancy.

Research has shown that increased customer engagement, (where store associates help customers in a retail store) results in higher sales. Therefore retail establishments desire to increase customer engagement and track customer engagement by measuring the interactions, and tracking the customer engagement.

It is desirable to have a method, system and apparatus for tracking motion of an area by a building control system for occupancy interaction detection.

SUMMARY

An embodiment includes an occupancy interaction detection system. The occupancy interaction detection system includes a plurality of sensors located within an area, the plurality of sensors operative to sense at least motion of a first occupant and a second occupant of the area, and communication links between each of the sensors and a controller. For an embodiment, the controller operative to receive sense data from the plurality of sensors, track locations of the first occupant of the area based on the sensed motion of the first occupant, track locations of the second occupant of the area based on the sensed motion of the second occupant, and identify an interaction between the first occupant and the second occupant, comprising detecting the first occupant to be within a threshold distance of the second occupant.

Another embodiment includes a method of occupancy interaction detection. The method includes sensing at least motion of a first occupant and a second occupant of the area, tracking locations of the first occupant of the area based on the sensed motion of the first occupant, tracking locations of the second occupant of the area based on the sensed motion of the second occupant, and identifying an interaction between the first occupant and the second occupant, comprising detecting the first occupant to be within a threshold distance of the second occupant.

Other aspects and advantages of the described embodiments will become apparent from the following detailed description, taken in conjunction with the accompanying drawings, illustrating by way of example the principles of the described embodiments.

DETAILED DESCRIPTION

Figure 1:
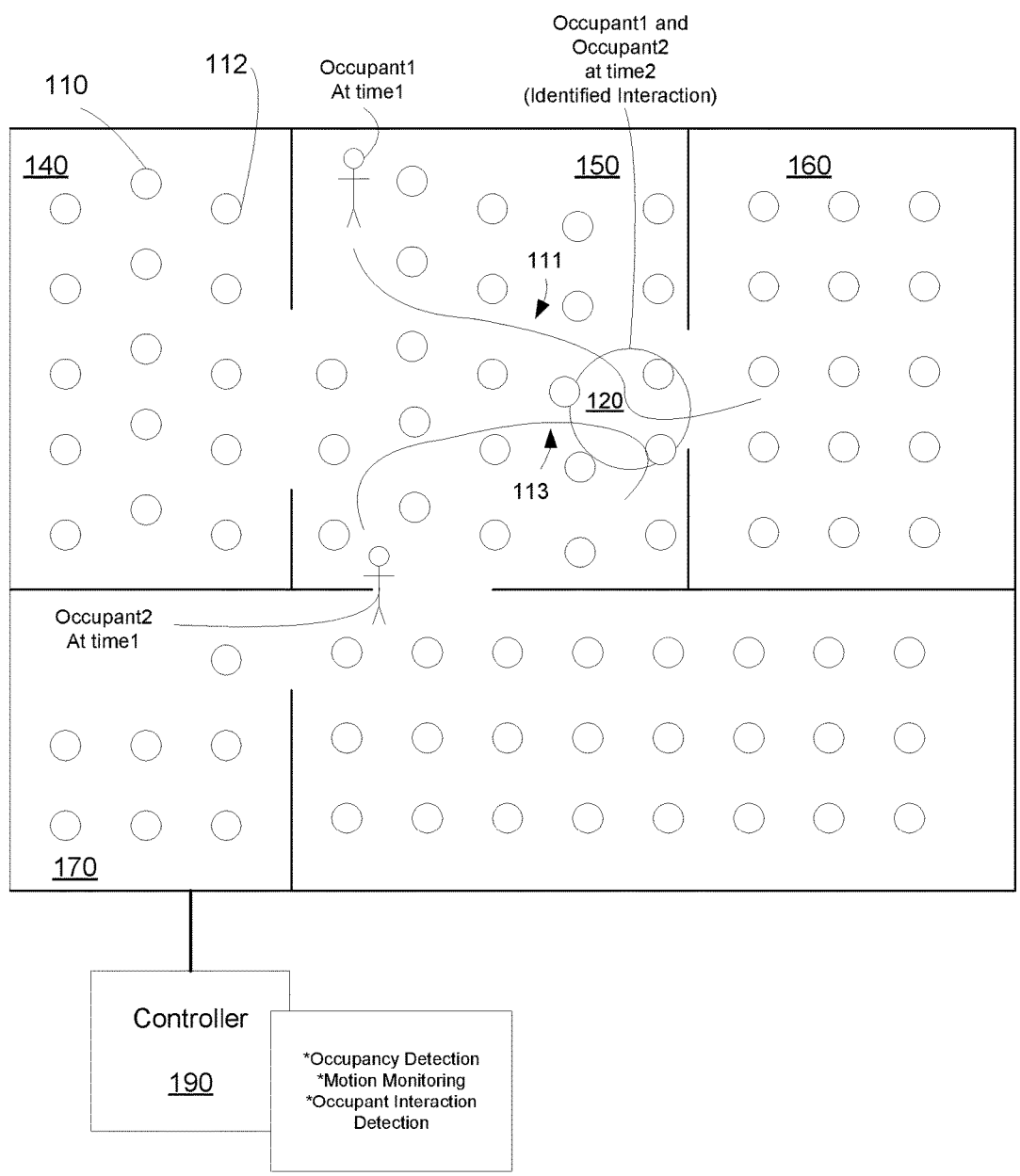
FIG. 1 shows an area that includes multiple rooms, wherein sensors within each of the multiple rooms and a controller are utilized for tracking motion and detecting occupancy interaction, according to an embodiment.

As shown in the drawings, the described embodiments provide methods, apparatuses, and systems for tracking motion and occupancy interaction detection. For at least some embodiments, the occupancy interaction includes a customer engagement. Further, for at least some embodiments, the effectiveness of the customer engagement is estimated.

FIG. 1 shows an area that includes multiple rooms 140, 150, 160, 170, wherein an array of sensors (such as, sensors 110 or 112) within each of the multiple rooms 140, 150, 160, 170 and a controller 190 are utilized for tracking motion and detecting occupant interaction, according to an embodiment. For at least some embodiments, communication links are established between each of the sensors and the controller 190. These links can be wired links, or wireless links. As shown, occupancy of a first occupant (occupant1) is sensed at a first time (time1). Further, for an embodiment, occupancy of a second occupant (occupant2) is also sensed at the first time (time1). Note that while occupancy of the first and second occupants are shown and described as occurring at the first time (time1), it is to be understood that for other embodiments the occupancy and motion detection of the different occupants does not have to occur at exactly the same time. The timing of the occupancy and motion sensing just needs to be able to sense the proximity of the occupants with respect to each other, and as will be described, sense the occupants being within a threshold distance from each other.

Further, motion of the occupants is sensed by the array of sensors according to described embodiments of occupant motion sensing. The motion sensing allows for tracking of the locations of the occupants. As shown, each occupant (occupant1, occupant2) generates a motion trail (trail 111 for occupant1 and trail 113 for occupant2) that depict successive estimated locations of each of the occupants over time.

Detecting an Interaction

For at least some embodiments, an occupancy interaction is detected with the occupants (occupant1 and occupant2) are sensed to be within a threshold distance of each other. That is, for an embodiment, sense data is received from the plurality of sensors. The locations of the first occupant of the area are tracked based on the sensed motion of the first occupant. The locations of the second occupant of the area are tracked based on the sensed motion of the second occupant. An interaction between the first occupant and the second occupant is identified by detecting the first occupant to be within a threshold distance of the second occupant. For various embodiments, the threshold distance is adaptively selected. That is, some types of interaction can be established by varying threshold distances. Further, for at least some embodiments, an interaction may be established after the occurrence based on tracked motion of the occupant after the interaction. That is, based on a later action of an occupant, historical analysis of the behaviors of the occupants, and past proximity (relative to each other) can be used to establish that an interaction occurred. Further, the threshold distance may be adaptively selected based on this historical analysis.

For at least some embodiments, identifying the interaction further includes detecting the first occupant to be within the threshold distance of the second occupant for greater than a threshold period of time. That is, as shown in FIG. 1, the threshold distance may be identified by the region 120. For an embodiment, determination of an interaction between the first occupant (occupant1) and the second occupant (occupant2) is determined by the occupants being within the threshold distance of each other. As shown in FIG. 1, this occurs at a second time (time2). For an embodiment, determination of an interaction between the first occupant (occupant1) and the second occupant (occupant2) is determined by the occupants not only being within the threshold distance of each other, but also determining the occupants to be within the threshold distance of each other for greater than the threshold period of time. In some instances, the threshold period of time confirms that the occupants are really interacting, and not just merely passing by each other. For at least some embodiments, the threshold period of time is adaptively selected. For example, if one occupant is a sales associate, and the other occupant is a customer, the threshold period of time can provide an indication of customer engagement. However, the threshold period of time can be selected based upon the type of product or service being sold. Further, other applications of occupant interaction may dictate other threshold periods of time.

For at least some embodiments, the timing a length of the identified interaction is timed. That is, for example, a threshold period of time may have been exceeded, but the timing of the interaction is further timed for other reasons. For example, such timing of the interaction may be used to determine how effective a particular sales associate is in customer engagements. A shorter effective engagement may be better than a longer engagement.

At least some embodiments further include utilizing an occupant identifier to detect an identifier of the first occupant or the second occupant. For example, the sensors may include motion sensors, but further support wireless communication. For example, for an embodiment, the sensors support an identifier that is either transmitted or read (e.g. Bluetooth beacon, RFID, QR or Bar Codes) communications, which is recognized by an overhead sensor (Bluetooth, RFID Reader, Video Camera). For an embodiment, one of the sensed occupants is carrying a mobile wireless device that supports Bluetooth or some other type of wireless communications. For an embodiment, the wireless device of the user transmits an identifier within, for example, a beacon that is received by one or more of the sensors. As such, the receiving sensor (Bluetooth, RFID, Video Camera), and therefore, the controller are able to identify the occupant.

At least some embodiments further include generating a profile of at least one of the first occupant and the second occupant based on identification of the at least one of the first occupant and the second occupant, and tracked motion of the at least one of the first occupant and the second occupant. The profile can include any number of useful pieces of identified and/or tracked information or behavior. For the profile may be generated for an identified sales associate. The profile may include one or more locations, a number of interactions, an effectiveness (measured by subsequent trails (tracked motion and locations after sensing an interaction or engagement)), or purchasing decisions).

As previously stated, at least some embodiments include detecting a customer engagement. For an embodiment, detecting a customer engagement includes the controller being further operative to associate the identifier of the first occupant or the second occupant with a sales associate, and detect the customer engagement based on the identified interaction between the first occupant an the second occupant, and the association of the sales associate with the identifier of the first occupant or the second occupant.

Tracking Motion of Occupants after an Interaction

Figure 2:
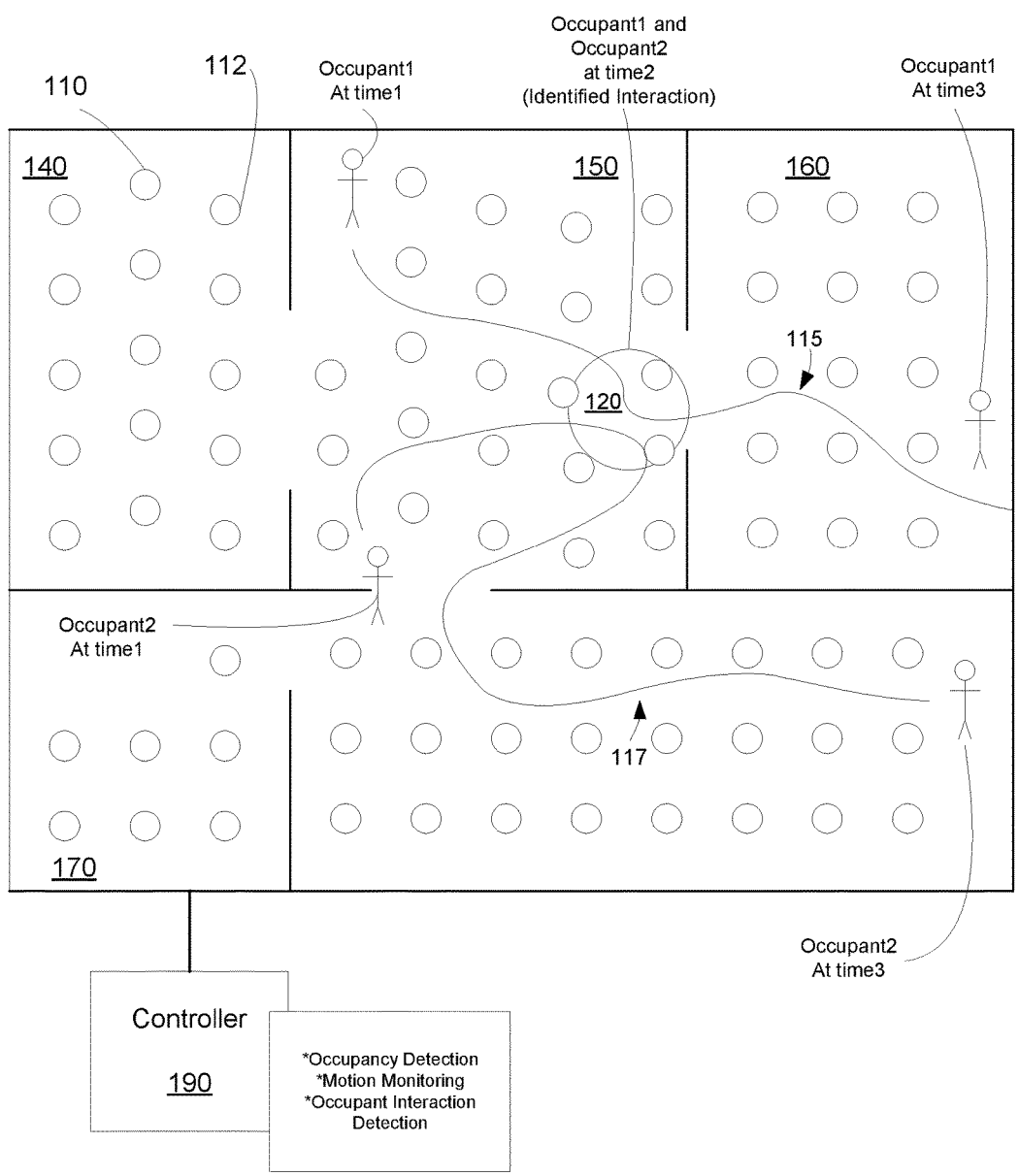
FIG. 2 shows an area that includes multiple rooms, wherein sensors within each of the multiple rooms and a controller are utilized for tracking motion and detecting occupancy interaction, according to another embodiment.

FIG. 2 shows an area that includes multiple rooms 140, 150, 160, 170, wherein an array of sensors (such as, sensors 110 or 112) within each of the multiple rooms 140, 150, 160, 170 and a controller 190 are utilized for tracking motion and detecting occupant interaction, according to another embodiment. This embodiment includes further tracking motion and location (115, 117) of the occupants (occupant1 at time3 and occupant2 at time3) after detecting the occupant interaction. The tracking of the occupants after detecting the occupant interaction can be very useful in determining what influence the occupant interaction had upon either of the occupants.

At least some embodiments include identifying an influence of the identified interaction on at least the first occupant of the second occupant based on the tracking of motion of at least the first occupant of the second occupant after identifying the interaction.

For at least some embodiments, at least one of the first occupant or the second occupant is determined to be a customer, and wherein the controller is further operative to track motion of the customer, and determine whether the customer completes a transaction. A transaction completion can be identified by the customer engaging with a cashier or be detecting a completed sale.

At least some embodiments include the controller being further operative to generate engagement metrics that measure how effective multiple different customer engagements are in completion of a transaction. For an embodiment, one or more metrics are generated for one or more of a plurality of identified sales associates. For an embodiment, the metrics include a number of identified customer engagements by the sales associate over a defined period of time. For an embodiment, the metrics include an average, a minimum, and/or a maximum time duration of customer engagements.

For an embodiment, the metrics include determining a number of engagements that result in a sale. For an embodiment, the metrics include an average or other statistical representation of a value of sales after sensing a customer engagement. For an embodiment, the metrics are utilized to rank or determined the effectiveness of the sales associates.

Multiple Occupants

Figure 3:
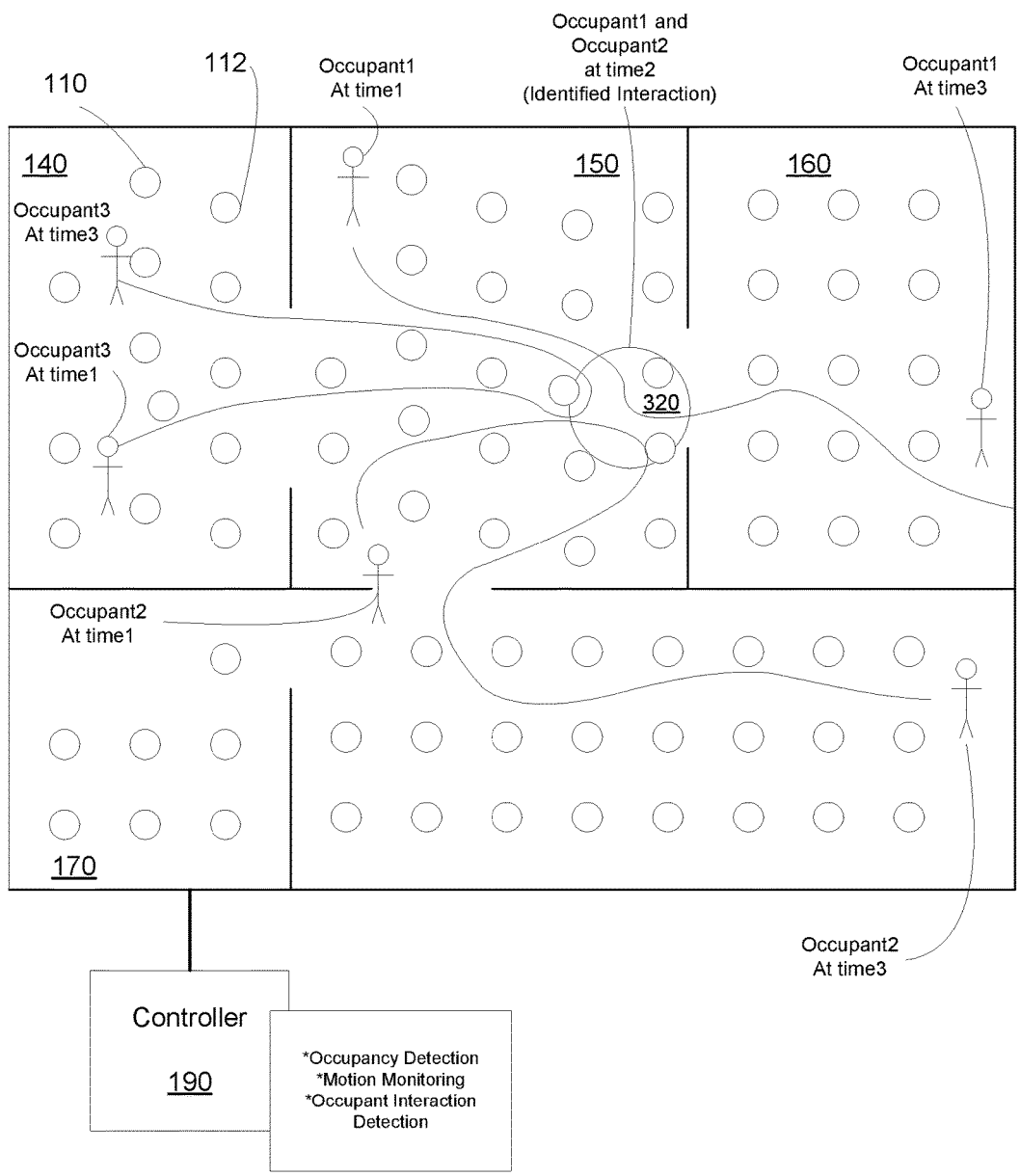
FIG. 3 shows an area that includes multiple rooms, wherein sensors within each of the multiple rooms and a controller are utilized for tracking motion and detecting occupancy interaction, according to another embodiment.

FIG. 3 shows an area that includes multiple rooms 140, 150, 160, 170, wherein an array of sensors (such as, sensors 110 or 112) within each of the multiple rooms 140, 150, 160, 170 and a controller 190 are utilized for tracking motion and detecting occupant interaction, according to another embodiment. This embodiment includes further tracking motion and location of a third occupant (occupant3). Further, an occupant interaction 320 is identified in which greater than two occupants (occupant1, occupant2, occupant3) interact. That is, for an embodiment, the plurality of sensors are further operative to sense at least motion of a third occupant of the area, and the controller is further operative to track locations of the third occupant of the area, and identify an interaction between the first occupant, the second occupant, and the third occupant, comprising detecting the first occupant, the second occupant and the third occupant to be within a threshold distance of each other. While shown as three occupants in the occupant interaction, any number of occupants can be included within an occupant interaction.

For at least some embodiments, customer engagements of multiple sales associates are tracked. For an embodiment, multiple sales associates simultaneously engaging with a single customer is tracked, thereby providing an alert of a potentially inefficient engagement. For an embodiment, congregations of sales associates are tracked, thereby providing an alert of a potentially inefficient engagement.

Figure 4:
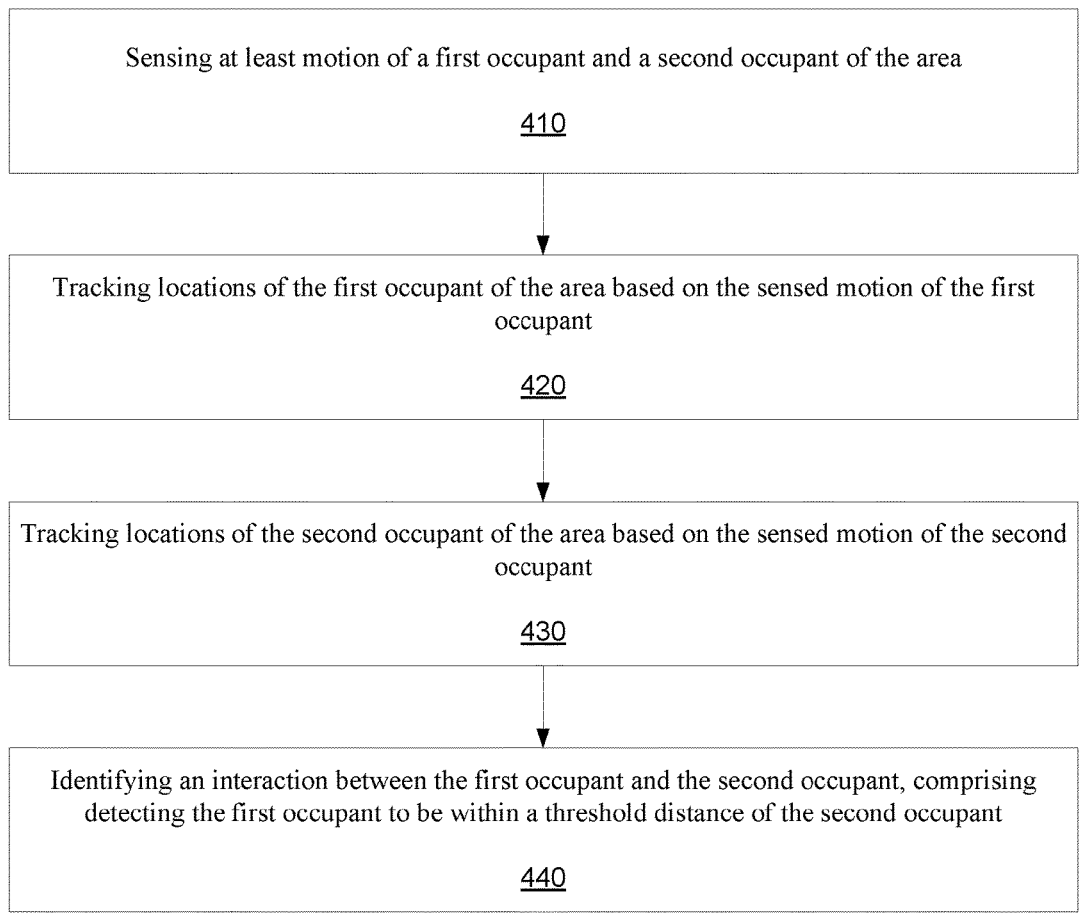
FIG. 4 is a flow chart that includes steps of a method of motion tracking and occupancy interaction detection, according to an embodiment.

FIG. 4 is a flow chart that includes steps of a method of motion tracking and occupancy interaction detection, according to an embodiment. A first step 410 includes sensing at least motion of a first occupant and a second occupant of the area. A second step 420 includes tracking locations of the first occupant of the area based on the sensed motion of the first occupant. A third step 430 includes tracking locations of the second occupant of the area based on the sensed motion of the second occupant. A fourth step 440 includes identifying an interaction between the first occupant and the second occupant, comprising detecting the first occupant to be within a threshold distance of the second occupant.

As previously described, at least some embodiments further include timing a length of the identified interaction.

As previously described, for at least some embodiments the plurality of sensors further sense at least motion of a third occupant of the area, and further including identifying an interaction between the first occupant, the second occupant, and the third occupant by detecting the first occupant, the second occupant and the third occupant to be within a threshold distance of each other.

As previously described, at least some embodiments further include tracking motion of at least the first occupant of the second occupant after identifying the interaction. As previously described, at least some embodiments further include identifying an influence of the identified interaction on at least the first occupant of the second occupant based on the tracking of motion of at least the first occupant of the second occupant after identifying the interaction.

As previously described, for at least some embodiments the plurality of sensors includes an occupant identifier that detects an identifier of the first occupant or the second occupant. As previously described, at least some embodiments further include generating a profile of at least one of the first occupant and the second occupant based on identification of the at least one of the first occupant and the second occupant, and tracked motion of the at least one of the first occupant and the second occupant. As previously described, at least some embodiments further include detecting a customer engagement, including associating the identifier of the first occupant or the second occupant with a sales associate, and detecting the customer engagement based on the identified interaction between the first occupant an the second occupant, and the association of the sales associate with the identifier of the first occupant or the second occupant. As previously described, for at least some embodiments at least one of the first occupant or the second occupant is determined to be a customer, and the motion of the customer is tracked, and whether the customer completes a transaction is determined. As previously described, at least some embodiments further include generating engagement metrics that measure how effective multiple different customer engagements are in completion of a transaction.

As previously described, at least some embodiments further include identifying a group of sensors that includes a plurality of neighboring sensors sensing motion greater than a motion threshold during a time interval, and tracking motion including linking the group to at least one past group of at least one past time interval. As previously described, for at least some embodiments the tracked motion of the group includes at least one of the plurality of neighboring sensors within the group being different than a plurality of sensors of the at least one past group.

As previously described, for at least some embodiments further include grouping the sense data according to identified groupings of the plurality of sensors, and sensing motion of the occupants within one or more of the groups based on the data analytics processing of the groups of sensed data. For at least some embodiments, the data analytics processing includes pattern recognition processing. At least some embodiments further include sensing numbers of occupants within one or more of the groups based on the data analytics processing of the groups of sensed data. For at least some embodiments, at least a portion of the plurality of sensors includes motion sensors, and sensing numbers of occupants within one or more of the groups based on the data analytics processing of the groups of sensed data includes grouping motion sensing data according to one or more identified rooms within the area, performing the data analytics processing once every sampling period, and performing the data analytics processing on the motion sensing data to determine a number of occupants within the one or more identified rooms, and a level of certainty of the number of occupants.

For an embodiment, a plurality of sensors of an area or structure, are monitored over multiple time intervals. For each time interval, groups of sensor are identified that sense motion of greater than a threshold for the time interval, thereby indicating the presence of, for example, an occupant. A group of a time interval is linked with other groups of different time intervals, thereby indicated motion. The motion is tracked across multiple time intervals, thereby tracking motion within the area or structure.

The aggregation of the sensor data over time provides valuable insights for parties interested in optimizing space utilization and planning the construction of future spaces. This aggregation can be used to detect abnormalities in real time operation of, for example, an office building.

Figure 5:
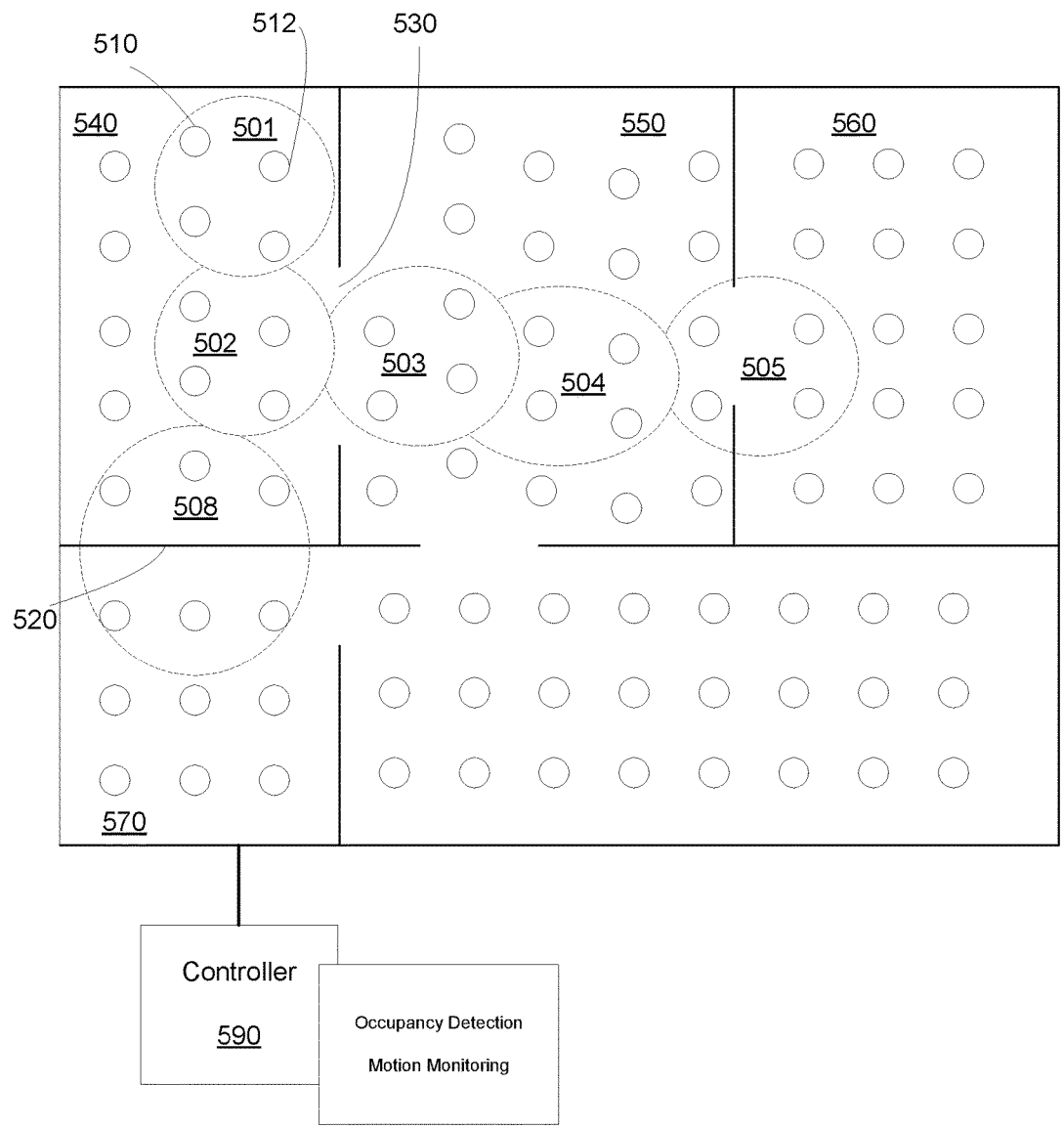
FIG. 5 shows an area that includes multiple rooms, wherein sensors within each of the multiple rooms and a controller are utilized for tracking motion and occupancy interaction detection, according to another embodiment.

FIG. 5 shows an area that includes multiple rooms 540, 550, 560, 570, wherein sensors (such as, sensor 510 or 512) within each of the multiple rooms 540, 550, 560, 570 and a controller 590 are utilized for tracking motion, according to an embodiment. Groups of sensors are identified for each of different time intervals 501, 502, 503, 504, 505 based on motion sensed by the sensors, and by the locations of the sensors.

For the first time interval 501, a sensor (such as, sensor 510) senses motion and generating a sense signal that indicates sensed motion of greater than a predetermined threshold. Neighboring sensors (such as, sensor 512) that also sense motion greater than the predetermined threshold or greater than a second predetermined threshold are included within the group of the first time interval 501. As will be described, for an embodiment, neighboring sensors are identified based upon prior knowledge of the locations of the sensors. For an embodiment, neighboring sensors are sensors having a location within a distance threshold of each other. However, for at least some embodiments, the criteria for determining or selecting neighbor sensors is not based on entirely based upon distances between sensors. At least some embodiments additionally or alternatively account for sensor spacing, other sensors in the area, and/or obstructions. Additionally, the distance threshold does not have to be preselected. For an exemplary embodiment, the distance threshold is selected to be two times the average distance to the second closest sensor (that is, the sensor second closest to initially sensing sensor). Generally, the distance threshold is preselected. For an embodiment, neighboring sensors are predetermined based on the prior location knowledge of the sensors.

For the second time interval 502, a sensor is again identified that sensed motion greater than a threshold. Again, a group is then determined. For at least some embodiments, motion is sensed by linking a group of the first time interval 501 with a group of the second time interval. For an embodiment, the linking is determined by the proximity of the sensors within the different groups. For an embodiment, the linking is established by a commonality of at least one sensor. For an embodiment, the linking is based on identifying neighboring sensors of the different groups. For an embodiment, the linking is based on identifying neighboring sensors that are also neighbors of neighboring sensors of the different groups.

The motion tracking also includes identifying groups that physically cannot exist, and motion of groups that physically cannot occur. For example, a group 508 can be determined for a time interval. However, due to the existence of a wall 520 within the group, physically, the group cannot actually exist, and the group is then determined to not be valid.

As shown, the motion tracking of the different time intervals 501, 502, 503, 504, 505 shows motion from the first room 540, to the second room 550, and to the third room 560. This motion physically is acceptable because the group motion passes through, for example, doorways (such as, doorway 530). However, such group motion would not be determined to be valid if the motion passed, for example, through a barrier, such as, a wall 520.

As shown, for an embodiment, a controller is electronically interfaced with a controller 590. For at least some embodiments, the controller 590 is operable to processed sensed sensor information to monitor motion of groups, and thereby, sense motion. While shown as a standalone controller, it is to be understood that for an embodiment, each of the sensors include controllers, and the sensed information processing can be performed by any combination of one of more of the sensor controllers. That is, the sensed information processing can be centralized, or de-centralized across the controllers of the sensors.

For an embodiment, communication links are established between each of the sensors and the controller 590. For an embodiment, the sensors are directly linked to the controller 590. For another embodiment, at least some of the sensors are linked to the controller 590 through other sensors. For an embodiment, the sensors form a wireless mesh network that operates to wirelessly connect (link) each of the sensors to the controller.

Regardless of the location or configuration of the controller 590, for an embodiment, the controller 590 is operative to receive sense data from the plurality of sensors, group the data according to identified groupings of the plurality of sensors, and track motion within at least a portion of the area based on data analytics processing of one or more of the groups of sensed data.

Figure 6:
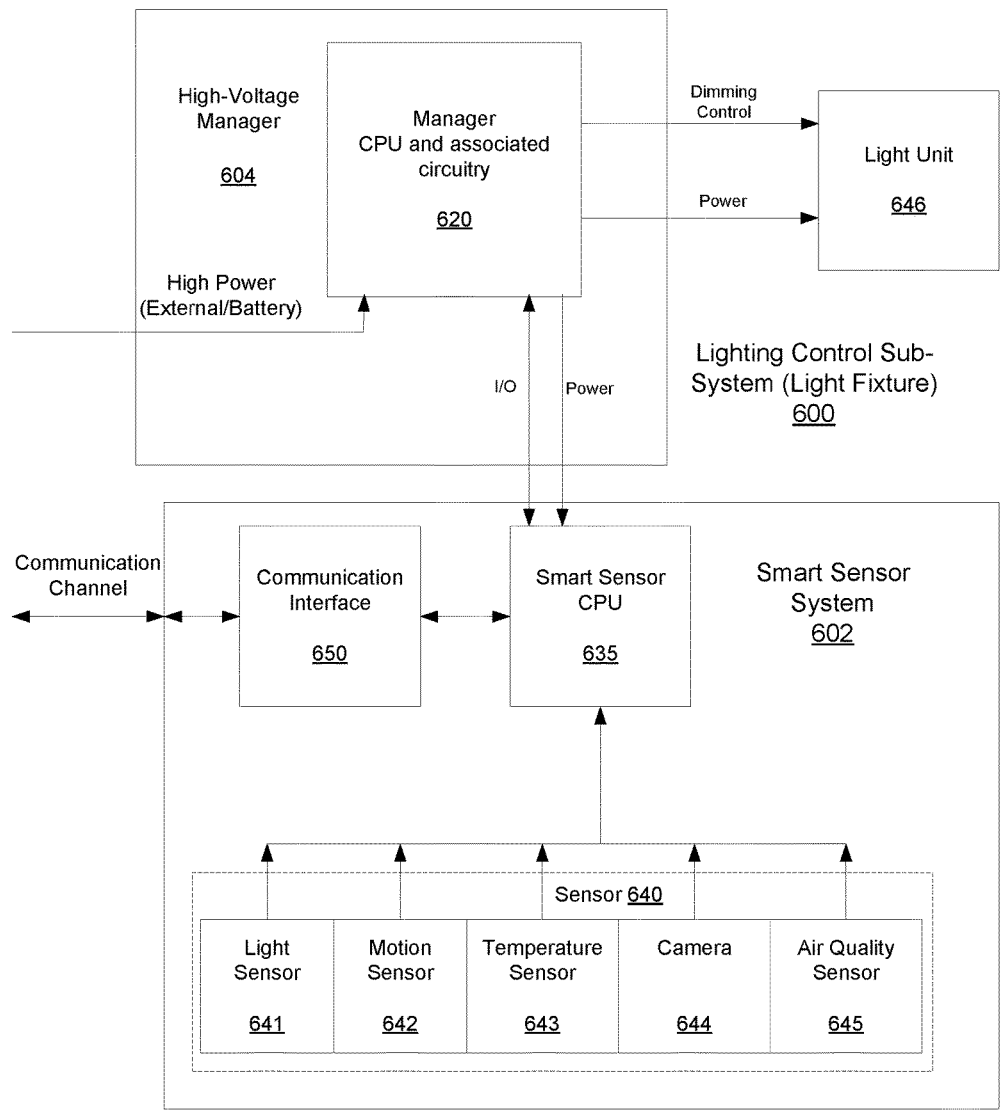
FIG. 6 shows a sensor and associated lighting control, according to an embodiment.

FIG. 6 shows sensor and associated lighting control, according to an embodiment. For an embodiment, the sensors described include a smart sensor system 602. Further, a lighting control system 600 includes the smart sensor system 602 that is interfaced with a high-voltage manager 604, which is interfaced with a luminaire 646. The sensor and associated lighting control of FIG. 6 is one exemplary embodiment of the sensors utilized for tracking motion. Many different sensor embodiments are adapted to utilization of the described embodiments for tracking motion. For at least some embodiments, sensors that are not directly associated with light control are utilized.

The motion tracking of the described embodiments can be utilized for optimal control of lighting and other environmental controls of an area or structure that utilizes the motion tracking. The control can be configured to save energy and provide comfort to occupants of the area or structure.

The high-voltage manager 604 includes a controller (manager CPU) 620 that is coupled to the luminaire 646, and to a smart sensor CPU 635 of the smart sensor system 602. As shown, the smart sensor CPU 645 is coupled to a communication interface 650, wherein the communication interface 650 couples the controller to an external device. The smart sensor system 602 additionally includes a sensor 640. As indicated, the sensor 640 can include one or more of a light sensor 641, a motion sensor 642, and temperature sensor 643, and camera 644 and/or an air quality sensor 645. It is to be understood that this is not an exhaustive list of sensors. That is additional or alternate sensors can be utilized for occupancy and motion detection of a structure that utilizes the lighting control sub-system 600. The sensor 640 is coupled to the smart sensor CPU 645, and the sensor 640 generates a sensed input. For at least one embodiment, at least one of the sensors is utilized for communication with the user device.

For an embodiment, the temperature sensor 643 is utilized for motion tracking. For an embodiment, the temperature sensor 643 is utilized to determine how much and/or how quickly the temperature in the room has increased since the start of, for example, a meeting of occupants. How much the temperate has increased and how quickly the temperature has increased can be correlated with the number of the occupants. All of this is dependent on the dimensions of the room and related to previous occupied periods. For at least some embodiment, estimates and/or knowledge of the number of occupants within a room are used to adjust the HVAC (heating, ventilation and air conditioning) of the room. For an embodiment, the temperature of the room is adjusted based on the estimated number of occupants in the room.

According to at least some embodiments, the controllers (manager CPU 620 and the smart sensor CPU) are operative to control a light output of the luminaire 646 based at least in part on the sensed input, and communicate at least one of state or sensed information to the external device.

For at least some embodiments, the high-voltage manager 604 receives the high-power voltage and generates power control for the luminaire 646, and generates a low-voltage supply for the smart sensor system 602. As suggested, the high-voltage manager 604 and the smart sensor system 602 interact to control a light output of the luminaire 646 based at least in part on the sensed input, and communicate at least one of state or sensed information to the external device. The high-voltage manager 604 and the smart sensor system 602 can also receive state or control information from the external device, which can influence the control of the light output of the luminaire 646. While the manager CPU 620 of the high-voltage manager 604 and the smart sensor CPU 645 of the smart sensor system 602 are shown as separate controllers, it is to be understood that for at least some embodiments the two separate controllers (CPUs) 620, 645 can be implemented as single controller or CPU.

For at least some embodiments, the communication interface 650 provides a wireless link to external devices (for example, the central controller, the user device and/or other lighting sub-systems or devices).

An embodiment of the high-voltage manager 604 of the lighting control sub-system 600 further includes an energy meter (also referred to as a power monitoring unit), which receives the electrical power of the lighting control sub-system 600. The energy meter measures and monitors the power being dissipated by the lighting control sub-system 600. For at least some embodiments, the monitoring of the dissipated power provides for precise monitoring of the dissipated power. Therefore, if the manager CPU 620 receives a demand response (typically, a request from a power company that is received during periods of high power demands) from, for example, a power company, the manager CPU 620 can determine how well the lighting control sub-system 600 is responding to the received demand response. Additionally, or alternatively, the manager CPU 620 can provide indications of how much energy (power) is being used, or saved.

Figure 7:
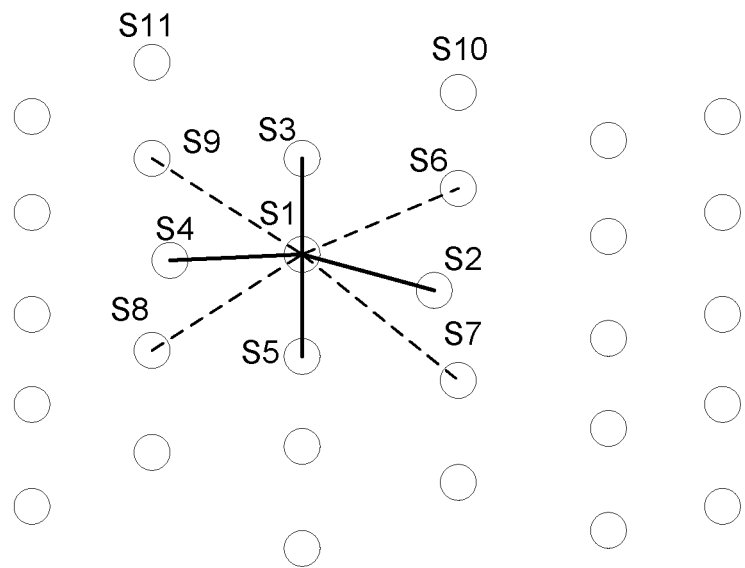
FIG. 7 shows multiple sensors, including specific sensors and neighboring sensors of the specific sensors, according to an embodiment.

FIG. 7 shows multiple sensors, including specific sensors and neighboring sensors of the specific sensors, according to an embodiment. As shown, a specific sensor S1 is identified. For an embodiment, location information of the sensors is utilized to identify neighboring sensors. The neighbor sensor determinations can be predetermined, or adaptively adjusted and selected based on the type of motion being tracked. For an embodiment, the neighboring sensors are preselected (chosen beforehand) and a not changed after being selected. For an embodiment, a neighboring status of two previously selected neighboring sensors can be updated or changed if the motion sensing patterns are not reflected by the motion sensing patterns of typical neighboring sensors.

As shown in FIG. 7, sensors S2, S3, S4, S5 are neighboring sensor of sensor S1. Therefore, when sensor S1 is determined to have sensed motion greater than a threshold, the neighboring sensors S2, S3, S4, S5 are checked to determine whether they sensed motion of greater than the threshold, or greater than a second threshold during the same time interval. For an embodiment, the neighboring sensors that do sense motion of greater than the threshold, or greater than a second threshold during the same time interval are included within a group established by the motion sensing of the sensor S1.

Further, as shown in FIG. 7, other proximate sensors are determined not to be neighboring sensor of S1. For an embodiment, sensors S6, S7, S8, S9, S10, S11 are not neighboring sensor because, for example, they are located more than a threshold distance away from the sensor S1.

As previously described, additional or alternate criteria can be used for the determination or selection of which sensor are designated as neighboring sensors other than distance alone. The neighboring sensor determinations can also take into account sensor spacing, other sensors in the area, as well as walls and obstructions. The distance threshold for determining neighboring sensors does not have to be preselected. For an exemplary embodiment, the distance threshold is two times the average distance between a sensor and its second closest sensor.

For example, the sensor S10 of FIG. 7 could be selected as a neighboring sensor of S11 because there is no sensor located directly above sensor S3. However, if there was a sensor location just above S3, then sensor S10 and sensor S11 would not be selected as neighboring sensors.

Figure 8:
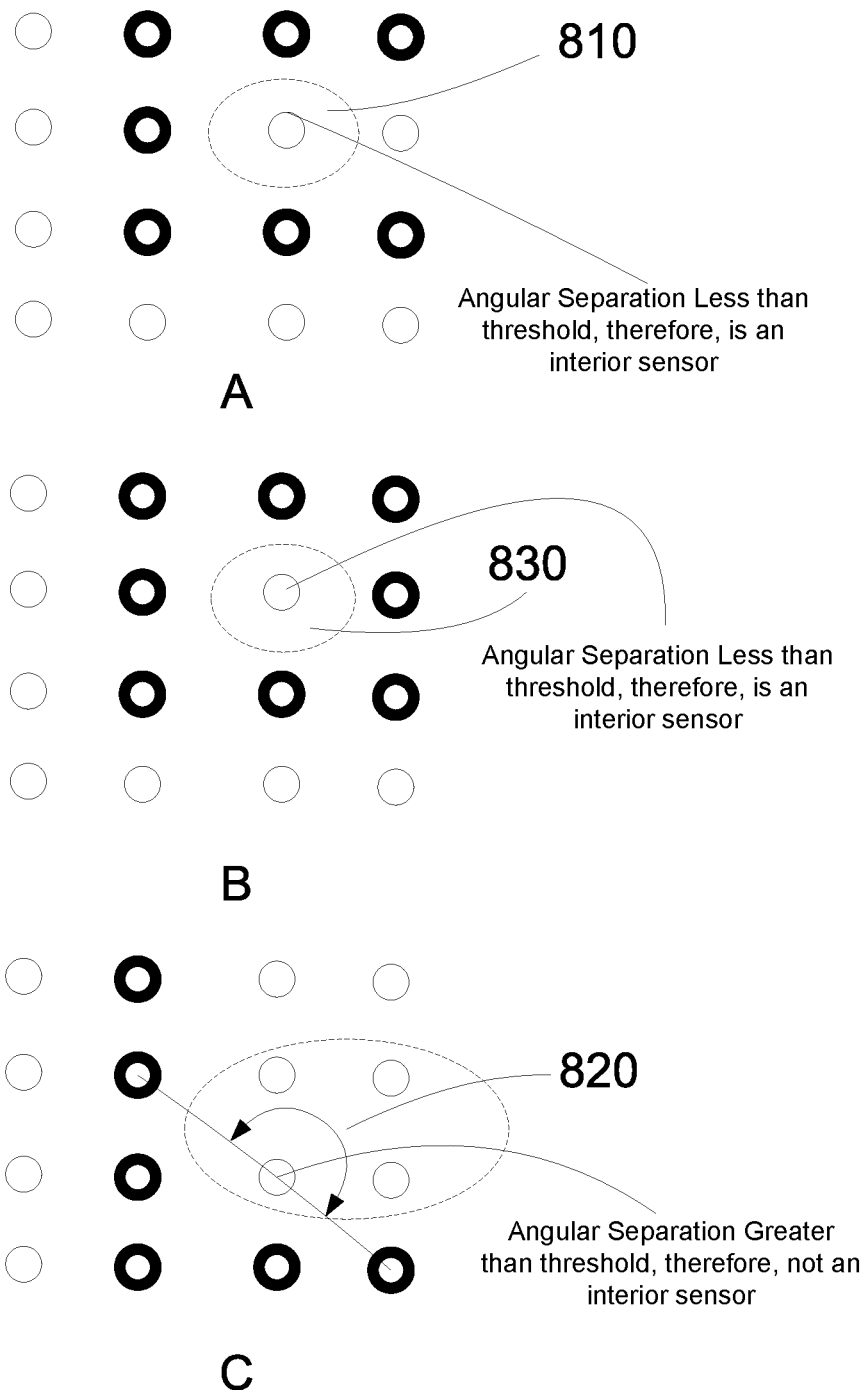
FIG. 8 shows invalid groups of sensors, according to an embodiment.

FIG. 8 shows invalid groups of sensors, according to an embodiment. As described, groups of sensor are identified over time intervals, and motion is tracked by linking the groups of the different time intervals. At least some embodiments include identifying groups that are initially selected, and then the shape of the group is refined (that is, modifying the sensors that are included within the group). For an embodiment, refining the shape of the group include identifying shape of the group that are not allowed for a valid group. For at least some embodiments, this includes identifying invalid shapes, and the changing the sensors included within the group to make the group into a valid or acceptable shape, or ignoring the motion tracking of the group.

FIG. 8 shows some exemplary invalid shapes. A first shape "A" includes a shape in the form of a "C". This shape of this group includes an interior sensor 810 which is not allowable. Therefore, the shape of this group is to be modified to eliminate the interior sensors.

A second shape "B" includes a shape in the form of a "O". This shape of this group includes an interior sensor 830 which is not allowable. Therefore, the shape of this group is to be modified to eliminate the interior sensors.

For an embodiment, an interior sensor is a non-active sensor (that is, a sensor that does not sense motion of greater than a motion threshold), wherein an angular separation between neighboring active sensors of the group is less than a threshold amount. For a specific embodiment, the threshold amount is approximately 135 degrees. This relationship hold true for both of the interior sensors of the first shape and second shape described above. Therefore, an embodiment includes invalidating a group of sensors of an internal non-active sensor has an angular separation between active sensors within the group of less than a threshold angle or amount. The sensors of the group are reselected to eliminate the non-active interior sensor.

A third shape "C" includes a shape in the form of an "L". Analysis of this shape, however, reveals that there are not interior sensors. That is, for each of the interior sensor candidates, there is an angular separation (as shown by the arrows 820) that is greater than 135 degrees.

However, the "L" shaped group could be broken down to eliminate sensors for other reasons.

Figure 9:
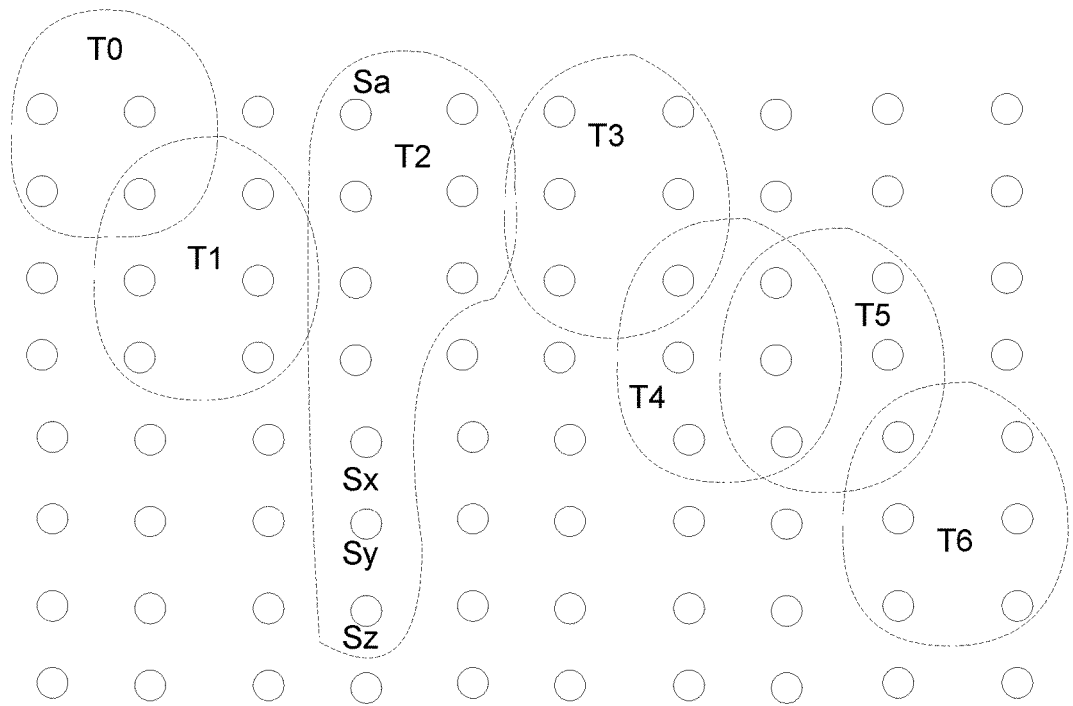
FIG. 9 shows a group of sensors being tracked over multiple frames, according to an embodiment.

FIG. 9 shows a group of sensors being tracked over multiple frames, according to an embodiment. For an embodiment, sensors of a group are not allowed to be greater than a predetermined distance from each other. For example, the group of time interval T2 of FIG. 9 includes sensors Sx, Sy, Sz that can be determined to be physically too far in distance from the sensor Sa. Therefore, the sensors Sx, Sy, Sz can be eliminated from group of the time interval T2. For an embodiment, the sensors Sx, Sy, Sz can be the basis for the formation of a new group.

Figure 10:
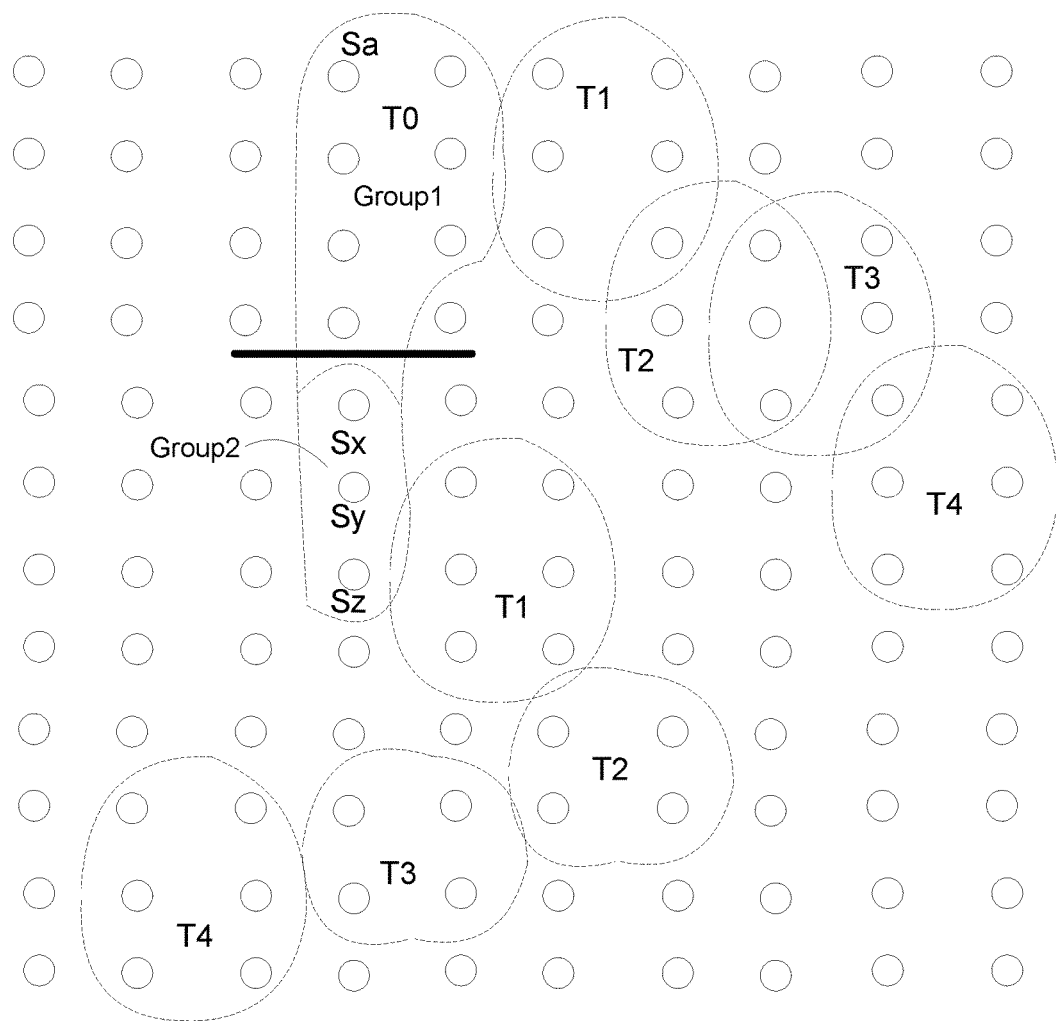
FIG. 10 shows an initially identified group of sensors being split, according to an embodiment.

FIG. 10 shows an initially identified group of sensors being split, according to an embodiment. As previously stated, the sensors Sx, Sy, Sz can be the basis for the formation of a new group, Group2. FIG. 10 shows subsequent groups of following time intervals T1, T2, T3, T4, T5, T6. As show, the group of the time interval T0 may provide the basis for more than one group. For an embodiment, the initial group is split, and separate groups are tracked over the subsequent time intervals.

Figure 11:
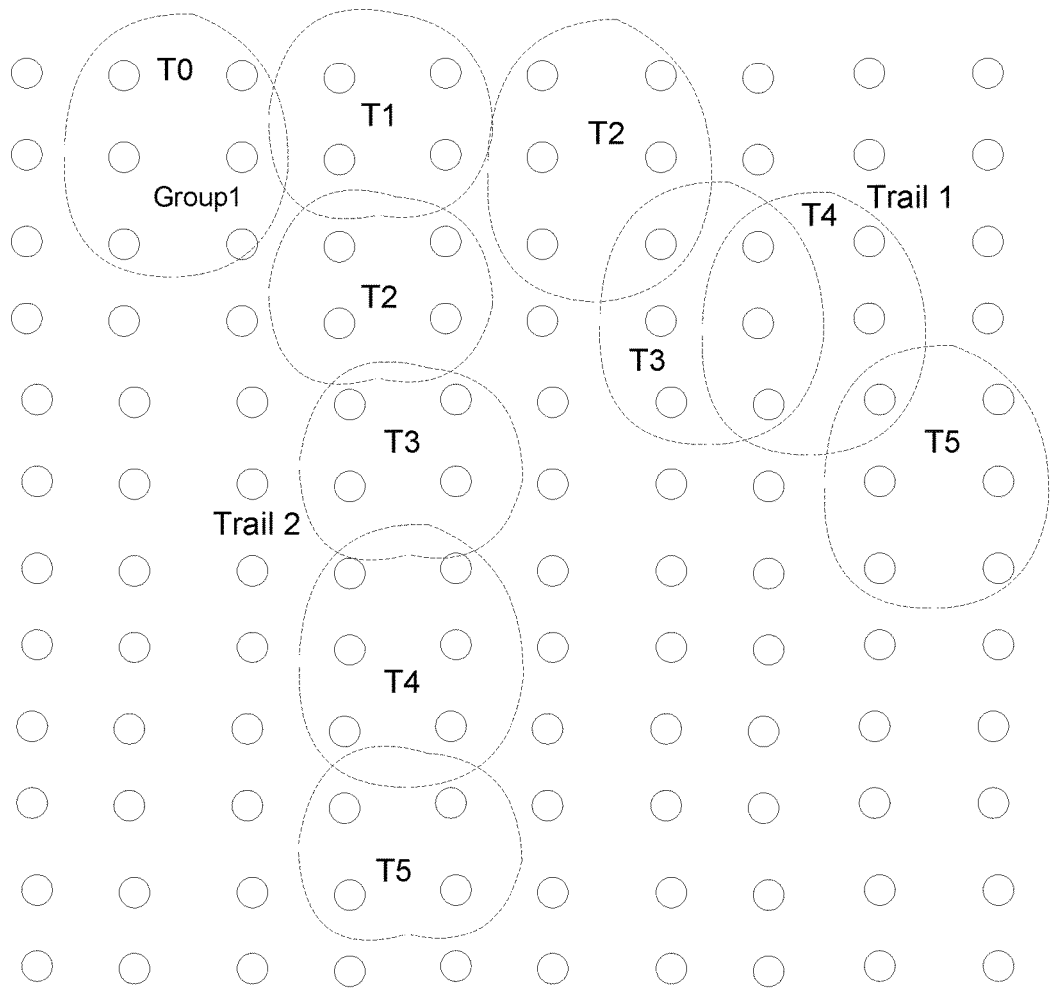
FIG. 11 shows an initially identified group of sensors being split, and two separate trails being formed, according to an embodiment.

FIG. 11 shows an initially identified group of sensors being split, and two separate trails being formed, according to an embodiment. As shown, a group is initially formed at time interval T0. Further, the group is tracked to time interval T1. However, at time interval T2, the group is split into two groups because retaining the active sensor as one group would be, for example, too large. At time intervals T3, T4, T5, the existing group and the newly formed group create two separate trails (trail 1, trail 2).

Figure 12:
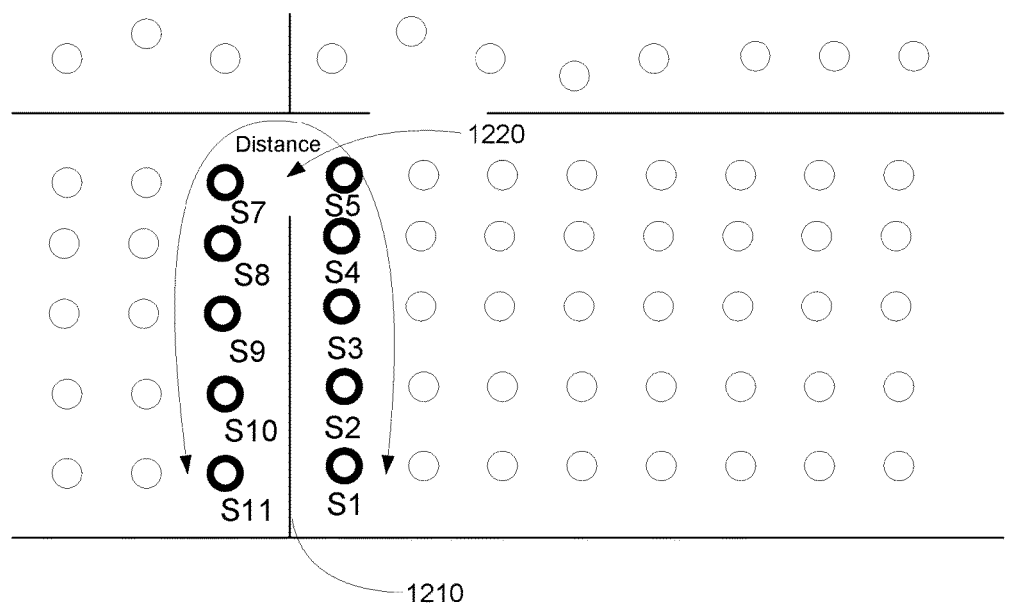
FIG. 12 shows an obstruction that includes a doorway, and formation of the group, according to an embodiment.

FIG. 12 shows an obstruction that includes a doorway, and formation of the group, according to an embodiment. This doorway and wall obstruction is similar to one depicted in FIG. 5. However, the potential group formed by the activated or triggered sensors S1-S11 that sense motion greater than the motion threshold, encompasses the wall 1210, and passes through the doorway 1220. However, as previously mentioned, at least some embodiment include a distance threshold in which activated sensors that are initially identified as member cannot be retained as members if the distance between them exceeds the distance threshold. In relation to the initially identified group of sensors S1-S11, and embodiment includes the distance between sensors being measured around and obstacles, such as the wall 1210. Therefore, the distance is measured as depicted by the distance arrow. That is, the distance extends from S1 to S11 through the doorway 1220. In order for the initially identified group to be retained, this distance must be less than the distance threshold.

Figure 13:
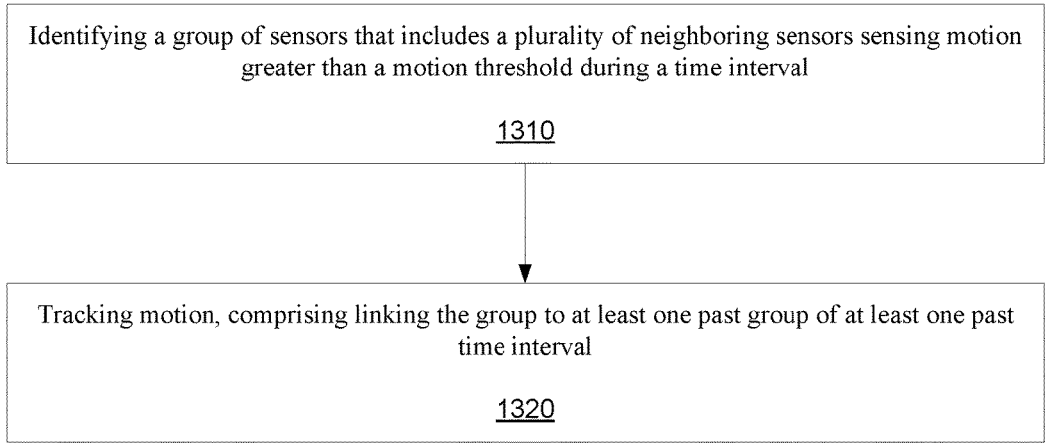
FIG. 13 is a flow chart that includes steps of a method of tracking motion, according to another embodiment.

FIG. 13 is a flow chart that includes steps of a method of tracking motion, according to another embodiment. A first step 1310 includes identifying a group of sensors that includes a plurality of neighboring sensors sensing motion greater than a motion threshold during a time interval. A second step 1320 includes tracking motion, comprising linking the group to at least one past group of at least one past time interval.

While the describe embodiments include tracking motion of identified groups across multiple time intervals, it is to be understood that for at least some embodiments a lack of motion is tracked. This is useful, for example, for tracking movement of an occupant who may have stopped moving.

For an embodiment, the tracked motion of the group includes at least one of the plurality of neighboring sensors within the group being different than a plurality of sensors of the at least one past group. That is, if for example, an occupant is moving within an area or a structure, the group of sensors that detect motion of the occupant changes from one time interval to a following time interval. At least some embodiments include confirming that the group changes are large enough to constitute motion of the group.

For at least some embodiments, the group of sensors is a subset of a larger set of sensors, and location data of each of the larger set of sensors is obtained, thereby allowing a determination of which of the larger set of sensors are neighboring sensors. That is, the group of sensors belongs or is within a larger set of sensors that are spaced about an area, room or structure. For at least some embodiments, the tracking of motion needs knowledge of what sensors are neighboring sensors. Information about the location of each of the sensors of the larger set of sensors allows a determination of which sensor are neighboring sensors. For example, the set of sensor closest to a sensor can be determined to be neighboring sensors. The set of sensors that are within a threshold of physical distance from a sensor can be determined to be neighboring sensors.

At least some embodiments include obtaining location data of obstructions located within the larger set of sensors. This information can be useful for group determination. For example, sensors may be identified as neighboring sensors based on their location. However, if the sensor are on opposite sides of an obstruction (such as, a wall) then it can be determined that the neighboring sensors cannot be included within a common group. Further, if a large group of sensors is formed that includes sensors in a doorway and sensors on both sides of walls, sensors far away from the doorway should not be included within the grouping. Further, if tracked motion appears to travel straight through an obstruction, a path of the tracked motion can be altered to pass around the obstruction.

For at least some embodiments, identifying the group of sensors that are included within the plurality of neighboring sensors sensing motion greater than the threshold during a time interval includes identifying a sensor that senses motion greater than the threshold, and then searching identified neighboring sensors of the sensor to find sensors that also sense motion greater than the motion threshold during the time interval. For at least some other embodiments, identifying the group of sensors that are included within the plurality of neighboring sensors sensing motion greater than the threshold during a time interval includes identifying a sensor that senses motion greater than the threshold, and then searching identified neighboring sensors of the sensor that also sense motion greater than a second motion threshold during the time interval. For an embodiment, the second motion threshold is less than the first motion threshold.

At least some embodiments further include refining the group of sensors, including checking locations of each of the plurality of sensors of the group and comparing the locations within locations of known obstructions, and eliminating sensor of the group that cannot be included within the group due to the location of the obstruction. That is, once a group of sensor is identified, the group is further analyzed to make sure it makes physical sense. That is, the group does not include sensors which clearly cannot be in a common group because an obstruction is located between sensors of the group.

At least some embodiments further include refining the group of sensors by determining whether the group is too large. That is, an initially determined group may be too large to actually make such a grouping possible. A threshold number of sensors can be selected in which a grouping is limited to be less than. For an embodiment, the refining of the group includes eliminating the existence of sensors of a group that are located a physical distance of greater than a threshold. That is, a physical distance can be selected or identified, wherein two sensors cannot be within a common group if the physical distance between them exceeds the selected or identified distance threshold.

For at least some embodiments, if the group is determined to be too large, then the group is split into multiple groups or one or more sensors are eliminated from the group. For an embodiment, if the group is split, then a determination is made of how many groups the sensors are split into (that is, 0, 3, 2, . . . ) where the groups formed (taking into account recent movement of groups), and which groups certain sensor are to belong.

At least some embodiments further include determining whether the group has a proper shape, comprising analyzing the plurality of sensors of the group to determine that locations of each of the sensors of the plurality of sensors indicates maintaining the sensor within the group. For an embodiment, determining whether the group has a proper shape includes identifying whether the group includes inactive interior sensors.

For at least some embodiment, tracking motion of the group includes matching the group of a current time interval with groups of prior time intervals to determine whether a trail of motion of the group is formed over a plurality of the time intervals.

At least some embodiments include confirming that the group originated from the at least one past group of at least one past time interval, including confirming that the group is location within a common area as the at least one past group, confirming that the group includes at least one neighboring sensors of the at least one past group. At least some embodiments include confirming that the group originated from the at least one past group of at least one past time interval, comprising confirming that the group is location within a common area as the at least one past group, confirming that the group includes at least one neighboring sensors that is a neighboring sensor of at least one sensor of the at least one past group.

At least some embodiments include designating the group as a child of the at least one prior group upon confirmation of origination. At least some embodiments include evaluating all child groups of a prior group to determine which of the child groups provides a most likely trail of the prior group. At least some embodiments include ranking each of the child groups based on at least one of a number of shared sensors, a quantity of sensors within the child group, a direction of travel between the prior group and the child group, and selecting the child group with the highest rank as the most likely trail of the prior group. Further, groups that include back and forth motion (jitter) may not be tracked.

Although specific embodiments have been described and illustrated, the described embodiments are not to be limited to the specific forms or arrangements of parts so described and illustrated. The embodiments are limited only by the appended claims.

What is claimed:

1. An occupancy interaction detection system, comprising:
    a plurality of sensors located within an area, the plurality of sensors operative to:
    sense at least motion of an associate and a customer of the area; and
    receive wireless beacons from a wireless device of at least one of the associate or the customer, wherein the wireless beacons include identifier information of the associate or the customer;
    a controller communicating with each sensor of the plurality of sensors, the controller operative to:
    receive sense data from the plurality of sensors;
    receive wireless beacon information from the plurality of sensors;
    identify the at least one of the associate or the customer among a plurality of occupants within the area based on the identifier information;
    track locations of the associate of the area based on the sensed motion of the associate;
    track locations of the customer of the area based on the sensed motion of the customer;
    identify an interaction between the associate and the customer, comprising detecting the associate to be within a threshold distance of the customer based on the tracked locations of the associate and the tracked locations of the customer; and
    determine that the interaction between the associate and the customer is a customer engagement based on a time duration of the interaction; and
    an environmental controller, wherein the environmental controller operates to control an environmental condition of the area, wherein the controller further operates to control the environmental controller to control the environmental condition of the area based at least in part on the tracked locations of at least one of the associate or the customer.

2. The system of claim 1, wherein identifying the interaction further comprises detecting the associate to be within the threshold distance of the customer for greater than a threshold period of time, wherein the threshold period of time is selectable.

3. The system of claim 1, wherein the plurality of sensors are further operative to sense at least motion of a third occupant of the area; and
    wherein the controller is further operative to track locations of the third occupant of the area;
    identify an interaction between the associate, the customer, and the third occupant, comprising detecting the associate, the customer and the third occupant to be within a threshold distance of each other.

4. The system of claim 1, further comprising tracking motion of at least the associate or the customer after identifying the interaction.

5. The system of claim 4, further comprising identifying an influence of the identified interaction on at least the associate of the customer based on the tracking of motion of at least the associate or the customer after identifying the interaction.

6. The system of claim 1, wherein the threshold distance is adaptively selected.

7. The system of claim 1, the controller is further operative to generate a profile of at least one of the associate or the customer based on the identifier information of the at least one of the associate or the customer, and tracked motion of the at least one of the associate or the customer.

8. The system of claim 1, wherein the controller is further operative to track motion of the customer, and determine whether the customer completes a transaction, wherein the transaction is identified by determining that the customer engages with a cashier.

9. The system of claim 8, wherein the controller is further operative to:
    detect multiple different customer engagements including the detected customer engagement;
    detect whether or not each of multiple customers of the different customer engagements completes a transaction;

generate engagement metrics that measure how effective the multiple different customer engagements were in completion of a transaction.

10. The system of claim 1, wherein the controller is further operative to:
identify a first group of sensors that includes a plurality of neighboring sensors sensing motion greater than a motion threshold during a first time interval;
identify a second group of sensors that includes a plurality of neighboring sensors sensing motion greater than a motion threshold during a second time interval;
the track motion, comprising linking the second group to the first group based on the plurality of sensors of the first group and the plurality of sensors of the second group.

11. The system of claim 10, wherein tracked motion includes at least one of the plurality of neighboring sensors within the second group being different than a plurality of sensors of the first group, and at least one of the plurality of neighboring sensors within the second group being common with at least one of the plurality of sensors of the first group.

12. The system of claim 1, wherein the controller is further operative to:
group the sense data according to identified groupings of the plurality of sensors;
sense motion of the occupants within one or more of the groups based on data analytics processing of the groups of sensed data.

13. The system of claim 12, wherein the data analytics processing comprises pattern recognition processing.

14. The system of claim 13, wherein the controller is further operative to sense numbers of occupants within one or more of the groups based on the data analytics processing of the groups of sensed data.

15. The system of claim 12, wherein at least a portion of the plurality of sensors comprises motion sensors and wherein sensing numbers of occupants within one or more of the groups based on the data analytics processing of the groups of sensed data comprises the controller being operative to:
group motion sensing data according to one or more identified rooms within the area;
perform the data analytics processing once every sampling period;
perform the data analytics processing on the motion sensing data to determine a number of occupants within the one or more identified rooms, and a level of certainty of the number of occupants.

16. A method of occupancy interaction detection, comprising:
sensing at least motion of an associate and a customer of an area;
receiving wireless beacons from a wireless device at least one of the associate or the customer, wherein the wireless beacons include identifier information of the associate and the customer;
identifying the at least one of the associate or the customer based on the identifier information;
tracking locations of the associate of the area based on the sensed motion of the associate;
tracking locations of the customer of the area based on the sensed motion of the customer;
identifying an interaction between the associate and the customer, comprising detecting the associate to be within a threshold distance of the customer based on the tracked locations of the associate and the tracked locations of the associate or the customer;
and
determining that the interaction between the associate and the customer is a customer engagement based on a time duration of the interaction; and
an environmental controller, wherein the environmental controller operates to control an environmental condition of the area, wherein the controller further operates to control the environmental controller to control the environmental condition of the area based at least in part on the tracked locations of at least one of the associate or the customer.

17. The method of claim 16, further comprising generating a profile of at least one of the associate or the customer based on identification of the at least one of the associate or the customer and tracked motion of the at least one of the associate or the customer.

18. The method of claim 16, further comprising generating detecting a customer engagement, comprising:
associating the identifier of the associate or the customer with a sales associate;
detecting the customer engagement based on the identified interaction between the associate an the customer, and the association of the sales associate with the identifier of the associate or the customer.

* * * * *